(12) United States Patent
Beliard et al.

(10) Patent No.: US 10,248,832 B2
(45) Date of Patent: Apr. 2, 2019

(54) METHOD OF DETERMINING, IN AN IMAGE, AT LEAST ONE ZONE LIABLE TO REPRESENT AT LEAST ONE FINGER OF AN INDIVIDUAL

(71) Applicant: MORPHO, Issy-les-Moulineaux (FR)

(72) Inventors: Cedric Beliard, Issy-les-Moulineaux (FR); Sebastien Bronsart, Issy-les-Moulineaux (FR); Cedric Thuillier, Issy-les-Moulineaux (FR)

(73) Assignee: Idemia Identity & Security, Issy les Moulineaux (FR)

( * ) Notice: Subject to any disclaimer, the term of this patent is extended or adjusted under 35 U.S.C. 154(b) by 466 days.

(21) Appl. No.: 14/820,369

(22) Filed: Aug. 6, 2015

(65) Prior Publication Data

US 2016/0042222 A1 Feb. 11, 2016

(30) Foreign Application Priority Data

Aug. 6, 2014 (FR) ...................... 14 57659

(51) Int. Cl.
*G06K 9/00* (2006.01)
*G06K 9/46* (2006.01)
(Continued)

(52) U.S. Cl.
CPC ..... *G06K 9/00067* (2013.01); *G06K 9/00033* (2013.01); *G06K 9/00087* (2013.01);
(Continued)

(58) Field of Classification Search
CPC ........... G06K 9/00067; G06K 9/00033; G06K 9/00375; G06K 9/00087; G06K 9/46;
(Continued)

(56) References Cited

U.S. PATENT DOCUMENTS

2008/0044066 A1* 2/2008 Miura ................ G06K 9/00013
382/124
2009/0208070 A1 8/2009 Fourre et al.
(Continued)

FOREIGN PATENT DOCUMENTS

DE 196 12 949 C1 8/1997
WO WO 2007/000504 A1 1/2007

OTHER PUBLICATIONS

Rioux, "Color 3-D Electronic Imaging of the Surface of the Human Body," Proceedings of SPIE (International Society for Optical Engineering), 1994, p. 42-54, vol. 2277.

*Primary Examiner* — Joseph G Ustaris
*Assistant Examiner* — Jill D Sechser
(74) *Attorney, Agent, or Firm* — Muncy, Geissler, Olds & Lowe, P.C.

(57) ABSTRACT

A method of detecting zones liable to contain at least one finger print in an image of at least one portion of hand of an individual includes a step of acquiring the image, a step of determining a plurality of zones of the acquired image and a first selection step. The step of determining a plurality of zones determines that each zone is a continuous zone of points of the acquired image which each exhibit a luminous intensity level greater than or equal to a selected luminous intensity threshold value. The first selection step selects, from among the zones determined, the zones which are liable to represent at least one print of a finger.

14 Claims, 3 Drawing Sheets

(51) Int. Cl.
    *G06T 7/73*         (2017.01)
    *G06T 7/90*         (2017.01)
    *G06T 11/60*       (2006.01)
    *H04N 5/225*      (2006.01)
    *H04N 5/232*      (2006.01)

(52) U.S. Cl.
    CPC ........... *G06K 9/00375* (2013.01); *G06K 9/46* (2013.01); *G06K 9/4652* (2013.01); *G06K 9/4661* (2013.01); *G06T 7/73* (2017.01); *G06T 7/90* (2017.01); *G06T 11/60* (2013.01); *H04N 5/2256* (2013.01); *H04N 5/23293* (2013.01); *G06K 2009/4666* (2013.01)

(58) Field of Classification Search
    CPC ............... G06K 9/4661; G06K 9/4652; G06K 2009/4666; G06T 7/90; G06T 7/73; G06T 11/60; H04N 5/2256; H04N 5/23293
    See application file for complete search history.

(56) References Cited

U.S. PATENT DOCUMENTS

| | | | |
|---|---|---|---|
| 2010/0021014 A1* | 1/2010 | Bebis ................ | G06K 9/00375 |
| | | | 382/115 |
| 2013/0182077 A1 | 7/2013 | Holz | |
| 2014/0003679 A1* | 1/2014 | Han ................... | G06K 9/00013 |
| | | | 382/124 |
| 2015/0347833 A1* | 12/2015 | Robinson ............ | G01B 11/25 |
| | | | 348/77 |

\* cited by examiner

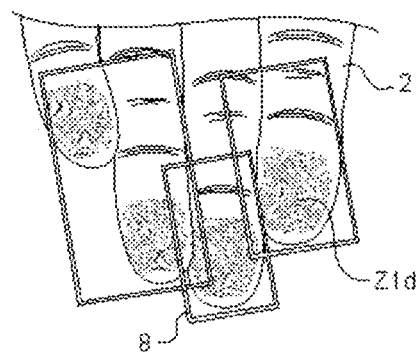
Fig. 3d
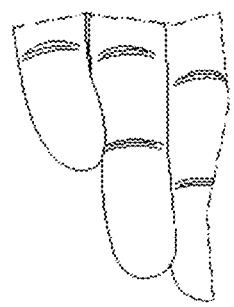
Vsn = VsMax
Fig. 3e1
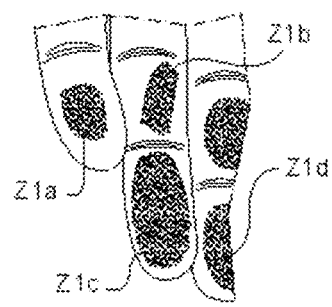
Vsn = Vs1
Fig. 3e2
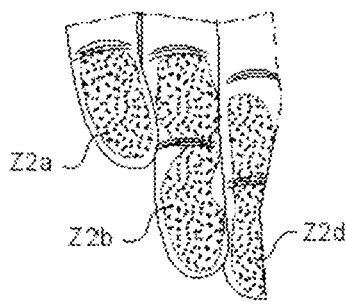
Vsn = Vs2
Fig. 3e3
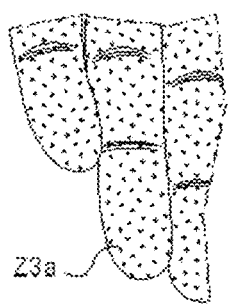
Vsn = Vs3
Fig. 3e4

METHOD OF DETERMINING, IN AN IMAGE, AT LEAST ONE ZONE LIABLE TO REPRESENT AT LEAST ONE FINGER OF AN INDIVIDUAL

The invention relates to a method of detecting, in an image of a hand, zones of the image that are liable to contain at least one finger print of this hand.

BACKGROUND OF THE INVENTION

A method of detecting a finger print in an image of an individual's hand acquired on the fly, without contact with the hand, is known from document WO2009/112717. In this method, to identify the finger print in the image, use is made of luminous test cards which are projected onto the hand and then a monochrome image is generated in one of the projected colours and this monochrome image is analysed so as to search therein for shapes characteristic of a print such as local deviations of the striations, shapes/contours of striations, the position of pores. Provided that these characteristic shapes are found in the image, it is known that an image representing a print has been identified.

This method of detection requires the projection of particular test cards and the analysis of the image so as to search therein for characteristics representative of prints. It would be desirable to simplify the method of detecting a hand print in an image.

OBJECT OF THE INVENTION

The object of the invention is to obtain an alternative method of detecting zones liable to contain at least one finger print in an image of at least one portion of hand of an individual.

SUMMARY OF THE INVENTION

With a view to achieving this object, there is proposed, according to the invention, a method of detecting zones liable to contain at least one finger print in an image of at least one portion of hand of an individual, this method being essentially characterized in that it comprises:

a) a step of acquiring the image of at least one illuminated portion of hand with the aid of an optical sensor and without contact with this hand;

b) a step of determining a plurality of zones of the acquired image, each zone thus determined being a continuous zone of points of the acquired image which each exhibit a luminous intensity level greater than or equal to a luminous intensity threshold value selected for the determination of the zone;

c) a first selection step for selecting, from among the zones determined, the zones which are liable to represent at least one print of a finger, this selection being carried out with the aid of at least one filtering criterion of a first type, chosen from among a finger shape identification criterion and/or a finger print standard texture identification criterion and/or a finger standard colour identification criterion.

The acquired image is composed of a plurality of juxtaposed points also called pixels.

To determine a zone, use is made of common characteristics shared between the points of the zone, in this instance:

the inherent levels of luminous intensity of each of the points of the zone are all greater than or equal to a selected intensity threshold value; and each point of the zone touches/is adjoined with at least one other point of this zone.

The expression continuous zone of points implies that the zone is composed solely of points which each touch at least one other point of the zone.

A first point which exhibits an inherent luminous intensity level greater than or equal to the selected luminous intensity threshold value but which would not be adjoined/adjacent with any other point also exhibiting an inherent level of luminous intensity greater than or equal to the said selected luminous intensity threshold would be excluded from the zone containing this first point.

The principle for determining the zones which is used in the method according to the invention is akin to the principle used in so-called watershed segmentation algorithms. These watershed segmentation algorithms are used in other technical fields remote from that of the identification of prints in images. Typically, a zone determined in the zone determination step is delimited externally by a so-called watershed line.

The method according to the invention makes it possible to exploit the luminous intensity variation over the acquired image, which is more significant at the centre of a given finger and decreases as one proceeds towards the edges of this finger. This property of luminous intensity variation is linked with the pseudo cylindrical shape of the finger. When the image of an illuminated finger, of pseudo cylindrical shape, is acquired, with the aid of an optical sensor and without contact with this hand, it is observed that the property of luminous intensity variation is visible on the zone of the acquired photographic image which contains this finger. The method according to the invention searches the acquired image for the zones exhibiting adjacent points which form a continuous zone of points and which have inherent levels of luminous intensity greater than or equal to selected intensity threshold values. Thus, for each selected threshold value, the zones of high luminous intensity are detected, which are those most liable to contain at least one top part of a finger and consequently those most liable to contain/represent at least one fingerprint.

This method according to the invention is inexpensive in terms of calculations but it greatly eases the work of locating the fingerprints in a hand image acquired on the fly. It furthermore makes it possible not to have to search for shapes characteristic of prints (striations, circumvolutions) in portions of the image which are hardly liable to contain any. By virtue of the method according to the invention, the search for prints is targeted towards the zones of the image where there is the greatest chance of culminating in the identification of a print. The method thus allows a saving in calculation time and resources.

For the understanding of the invention, the term without contact implies that the finger is remote from any mechanical clamping/locating element liable to deform it. Indeed, when contacting a finger on a mechanical element such as a scanner glass or a clamp for finger positioning with respect to the optical sensor, the finger is deformed and it is then probable that the zone of high luminous intensity will correspond to a zone of the finger other that the zone liable to contain a papillary fingerprint.

Accordingly, the method of the invention is performed without contact, that is to say whilst the finger is neither clamped in order to be positioned with respect to the optical acquisition facility, nor placed in contact against any mechanical element. Stated otherwise, the method according to the invention is implemented by acquisition of a finger image taken on the fly, whilst the finger can have a relative motion in the three dimensions with respect to the optical sensor.

The method according to the invention is particularly practical to implement since it does not make it necessary to position the finger, via mechanical stops, during the image acquisition.

After having targeted the zones determined that might contain prints, the method refines this targeting during a first selection step for selecting, from among the zones determined, the zones which are liable to represent at least one print of a finger.

This selection is carried out with the aid of at least one filtering criterion of a first type, chosen from among a finger shape identification criterion and/or a finger print standard texture identification criterion and/or a finger standard colour identification criterion.

The zones not selected during this first filtering step are not retained for the rest of the method, thereby making it possible to target the zones most liable to contain prints.

The finger shape identification criterion consists in retaining the zones determined which are elongate and are consequently liable to represent the outline of a print of a finger. Indeed, the general shape of a finger print is generally longer than it is wide.

Thus, this criterion consists in retaining the zones whose length to width ratio is greater than a threshold. It is for example possible to define the length of the zone as its length along its principal axis and its width along the axis perpendicular to its principal axis.

The identification criterion based on type texture of a finger print consists in searching the zone determined for the presence of a print texture, that is to say an image zone containing pores and/or capillary lines defining arcs and/or loops and/or whorls.

In a preferential mode of implementation of the method, a set of luminous intensity threshold values lying between a minimum intensity threshold value and a maximum intensity threshold value is selected and the step of determining a plurality of zones of the acquired image is carried out with the aid of each of the threshold values of the set of threshold values, and then the plurality of the zones of the captured image which have been determined with each of the threshold values of the set of threshold values is stored.

By virtue of the set of various chosen threshold values, a set of zones of the captured image which are each liable to represent at least one part of a finger is obtained. Thus, the set of zones comprises zones liable to represent one and the same finger or several fingers. The use of several threshold values makes it possible to fix a zone detection sensitivity by choosing a given threshold value.

At each selected threshold value, one or more zones of the image will be identified which are different from the image zone or zones identified with another threshold value. By storing all the zones determined with the various threshold values, the set of possible zones of the captured image which are liable to contain/represent at least one finger is enriched. The work of identifying the image zones is thus eased by systematic and homogeneous processing of the image whose result is a targeted list of zones liable to represent a finger print. The work of searching for a finger print can thus be limited to a part of the zones determined and stored in the set of zones. One thus avoids having to search for the presence of a finger print in portions of the image which are outside the zones determined/enumerated and one thus limits the volume of calculations necessary for the identification of prints in the acquired image.

According to another embodiment of the invention, the method furthermore comprises a second selection step consisting in filtering the previously selected zones on completion of the first selection step, with the aid of at least one filtering criterion of a second type. This filtering criterion of a second type is chosen from among:

a criterion of maximum separation between zones, this maximum separation criterion being determined so as to retain, in a set of retained zones, only zones previously selected on completion of the first selection step, which are mutually neighbouring and which are liable to represent solely portions of prints of fingers of one and the same hand; and/or a criterion of areal ratio between mutually neighbouring zones, this areal ratio criterion being determined so that the ratio between areas of mutually neighbouring zones lies between predetermined minimum and maximum values of areal ratio, the mutually neighbouring zones which meet this areal ratio criterion being retained in a set of retained zones; and/or a criterion of relative orientation between mutually neighbouring zones, the mutually neighbouring zones which meet this orientation criterion being retained in a set of retained zones.

Whilst each of the filtering criteria of the first type is determined so as to analyse the individual features of the zones, zone by zone, each of the filtering criteria of the second type is determined so as to analyse the consistency between determined neighbouring zones so as to:

retain the zones determined liable to represent prints of one and the same hand; and to reject the zones determined which do not seem liable to represent prints of one and the same hand.

The criterion of maximum separation between zones makes it possible, for example, to preserve in the set of retained zones only neighbouring zones, that is to say zones that are not too far separated, that is to say image zones representing parts separated from one another by a separation distance of less than a predetermined maximum number of pixels.

The areal ratio criterion makes it possible, for example, not to retain two neighbouring zones having respective surface areas that are too different from one another, and to retain the zones whose respective surface areas are close to one another, that is to say whose ratio between these surface areas lies in a predetermined span of ratio values.

The criterion of relative orientation between mutually neighbouring zones will now be presented. Each zone determined exhibits a longitudinal dimension or principal dimension which is its most significant dimension, that is to say its inherent length. Each zone exhibits an inherent principal axis which extends parallel to this zone's inherent principal dimension. The angle of orientation formed between two neighbouring zones is the acute angle formed between the principal axes of these neighbouring zones. By neighbouring zones is meant two zones which are spaced apart by a distance of less than a predetermined distance, for example a predetermined distance given in terms of number of pixels and representative of a maximum spacing between two ends of neighbouring fingers.

The orientation criterion is adapted to retain neighbouring zones, in the set of retained zones, only if the angle of orientation between these neighbouring zones is less than a predetermined maximum angle value, typically less than 45° of angle and preferentially less than 30°.

This orientation criterion makes it possible to distinguish:
image zones liable to contain prints belonging to one and the same hand, that is to say prints which are neighbouring and oriented with respect to one another by at most 45° and preferentially by at most 30°;
from other zones of the image which are liable to contain prints belonging to several hands (typically neighbouring prints disposed at 60° of angle with respect to one another probably belong to several hands and are not retained by the orientation criterion).

In a particular embodiment of the method, the acquired image is a colour image and, in order to determine the luminous intensity levels of the points of the acquired image, use is made of a grey level image generated on the basis of the colour image acquired.

The evaluation of the inherent intensity level specific to each point of the colour image acquired is carried out with the aid of the measurement of the luminous intensity level of the point of the grey level image which corresponds to the point of the colour image acquired.

The measurement of luminous intensity level is easier to carry out on the grey level image than on the colour image. Thus, this embodiment eases the processing of the image with a view to the identification of the zones of the colour image acquired which are liable to contain/represent at least one print of a finger.

It is noted that this grey level image exhibits preferentially/substantially the same luminance and chrominance levels as the colour image acquired. However, this grey level image may be a negative of the colour image acquired, in this case the luminance and chrominance levels of the negative image are inverted with respect to those of the colour image acquired. Even if the grey level image is a negative of the colour image acquired, the condition for selecting the points of the continuous zone of points in the acquired image still remains a function of the respective luminous intensity levels of the points of the colour image that are estimated with the aid of the grey level image.

According to another aspect, the invention pertains to a device for determining, in an image, at least one zone of this image which is liable to represent at least one finger print of an individual, this device being adapted to implement any one of the embodiments of the method according to the invention.

Typically, this determination device according to the invention comprises an intelligent telephone, a so-called smartphone.

By virtue of its ease of implementation, the method according to the invention makes it possible to target, in an image taken with a mobile telephone or a digital tablet or a laptop computer, the zones most liable to represent prints, thereby simplifying the operations of searching for characteristics of prints in the image. The volume of calculations necessary for the search for characteristics of prints in an image is thus reduced thereby facilitating the implementation of the invention with limited calculation means as is the case with a mobile telephone.

BRIEF DESCRIPTION OF THE DRAWINGS

Other characteristics and advantages of the invention will emerge clearly from the description which is given thereof hereinafter, by way of wholly nonlimiting indication, with reference to the appended drawings, in which:

FIG. 3b presents the grey level image generated on the basis of the acquired colour image of FIG. 3a;

FIG. 3d represents the colour image acquired on which have been superimposed frames which each identify a site of a determined zone;

FIGS. 3e1, 3e2, 3e3, 3e4 each represent a portion of hand and the zones determined liable to represent a print; these zones vary from one image to the other since each image is established with its own selected intensity threshold value.

DETAILED DESCRIPTION OF THE INVENTION

As indicated previously, the invention pertains to a method of detecting zones each liable to contain at least one finger print in an image of a portion of hand.

Figure 1:
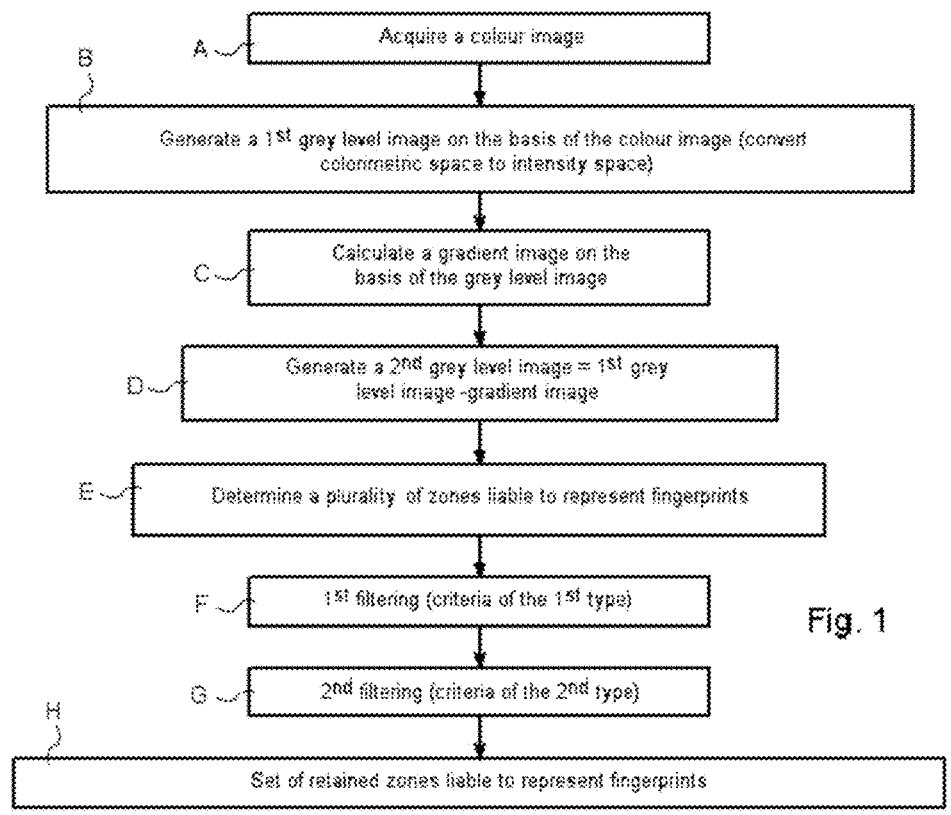
FIG. 1 represents the chronology of the steps of the method according to the invention.
Figure 2:
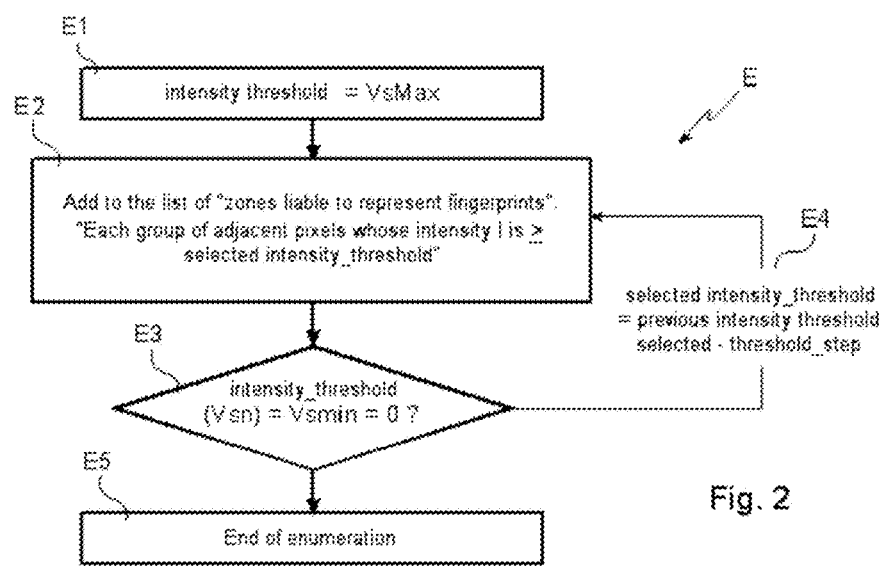
FIG. 2 presents a detail of the step of determining the plurality of zones each liable to represent a print.

This method which will be detailed hereinafter with reference to FIGS. 1 and 2 is implemented with the aid of a device 11 for determining zone(s) in an image. As seen in particular in FIG. 3a, this device 11 comprises:
a local group 11a of means assembled together; and optionally
a remote group 11b of means for identifying individuals on the basis of characteristics of fingerprints.

Typically, the local group 11a of means assembled together is an intelligent telephone.

This local group 11a of means assembled and linked together comprises:
at least one optical sensor 4a;
at least one optical lighting means 4b;
at least one processor;
at least one memory;
at least one program which, when executed by the processor, implements the determining method according to the invention;
preferentially an acquired image display means such as a screen 4c; and
optionally telecommunication means adapted to exchange data with the group 11b of means for identifying individuals which is remote from the said local group 11a.

The local group 11a executes the method according to the invention locally and, when it has determined and retained zones of the acquired image each liable to contain at least one fingerprint, it transmits to the remote group 11b data 12a containing characteristics representative of the prints represented on the determined and retained zones of the image.

The remote group 11b receives these characteristics representative of prints and compares characteristics of each of the zones of the set of retained zones with characteristics of images of prints contained in the prerecorded database 10 stored at the level of the remote group 11b.

In case of a match between characteristics of one of the zones of the set of retained zones Z1a, Z1b, Z1c, Z1d, Z2a, Z2b, Z2d, Z3a and of one of the fingerprints of the prerecorded database 10, then the remote group 11b stores an identification link representative of this match.

It is considered that there is a match between characteristics of one of the zones and a fingerprint if at least a certain number of predetermined matching criteria are satisfied.

This identification link and/or a notification 12b confirming the identification is transmitted to the local group 11a by the remote group 11b.

The processor of the local group 11a can condition the execution of an action on the prior receipt of the identification link and/or of the notification 12b confirming the identification. For example, the conditioned action can be the validation of a right of access to an application to be executed, such as a payment application or a screen unlocking application 4c.

In certain particular cases, the prerecorded database can be recorded in the memory of the local group 11a and, in this case, the local group 11a:

compares characteristics of each of the zones Z1a, Z1b, Z1c, Z1d, Z2a, Z2b, Z2d, Z3a of the set of retained zones with characteristics of images of fingerprints contained in the database prerecorded at the level of the local group 11a; and in case of a match between characteristics of one of the zones of the set of retained zones and of one of the fingerprints of the prerecorded database, then the local group 11a of means stores the identification link representative of this match and/or generates a notification confirming the identification; and the processor of the local group 11a conditions the execution of an action on the prior generation of the identification link and/or of the notification confirming the identification. The conditioned actions are the same as those described previously or any other action.

The method of detecting zones each liable to contain at least one finger print in an image will now be described with reference to FIGS. 1 and 2.

This method comprises a step A of acquiring a colour image of an illuminated hand 2 whilst it is displaced facing a principal optical axis X1 of the optical sensor 4a. This lighting is preferentially carried out with the aid of the optical means of artificial lighting 4b which exhibits a principal lighting axis X2.

During this image acquisition step A, the hand is displaced in such a way that it has a smaller speed of displacement with respect to the principal optical axis X1 than a predetermined maximum speed, in this instance at most 1 meter per second, and in such a way that it is at a smaller distance from the optical sensor than a predetermined maximum acquisition distance, in this instance at most 1 meter.

As the optical sensor 4a and the optical lighting means 4b are mechanically interlinked and are designed so that the optical axis X1 and the principal lighting axis X2 are mutually parallel, it is observed on the acquired colour image 1 that the salient parts such as the middle of the fingers which are of pseudo cylindrical shapes are the most illuminated and that the sunken parts of the hand, such as the edges of the fingers, are the least illuminated.

The most illuminated points of the image which belong to one and the same continuity of points define a zone liable to contain at least one print. The method according to the invention makes it possible to determine these zones.

For this purpose, a step B of generating a first grey level image on the basis of the colour image is carried out. This operation makes it possible to carry out a conversion of the colorimetric space specific to the colour image acquired to a luminous intensity space specific to a grey level image.

After implementation of this step B, a step C of calculating a gradient image representing the first grey level image is implemented.

After having calculated this gradient image, a step D is implemented, in the course of which a second grey level image is generated, which corresponds to the first grey level image from which the gradient image has been subtracted.

Step B makes it possible to pass from a colour space to a grey level space in which the rest of the processings will be performed. Steps C and D make it possible to obtain a second grey level image accentuating the disparities between intensity levels of the points which are accentuated with respect to the first grey level image (for example the disparities in intensity between an illuminated centre zone of the finger and a less illuminated edge zone of the finger are accentuated).

With the aid of this second grey level image, a plurality of zones Z1a, Z1b, Z1c, Z1d, Z2a, Z2b, Z2d, Z3a which are each liable to represent at least one fingerprint 3 is determined in step E.

This step E is detailed in FIG. 2. During a first sub-step E1, a maximum intensity threshold value VsMax is selected. Next, in step E2, the second grey level image is searched for the set of points having an inherent luminous intensity level greater than or equal to the selected threshold value Vsn.

The set of continuous zones of points whose respective levels of luminous intensity are greater than or equal to VsMax is identified in this second grey level image. Next, one stores all these continuous zones thus identified in a set of zones.

After implementation of sub-step E2, sub-step E3 is implemented, during which it is verified whether the intensity threshold value which has just been selected is equal to a predetermined minimum value Vsmin. As long as this is not observed, a sub-step E4 is carried out, consisting in calculating a new selected intensity threshold value. This new selected intensity threshold value is equal to the previous selected threshold value decreased by a predetermined value of step size "threshold_step".

After carrying out this sub-step E4, sub-step E2 is carried out again, but using the new threshold value calculated in sub-step E4.

This makes it possible to determine new continuous zones of points, all of which are composed exclusively of points having inherent levels of luminous intensity greater than or equal to the new threshold value. These zones are also stored in the set of determined zones each liable to represent at least one print.

When, in sub-step E3, it is observed that the selected threshold value which has just been used in the previous sub-step E2 is equal to Vsmin, then we go to sub-step E5 which consists in signalling the end of the enumeration of the zones liable to represent a print.

Figure 3A:
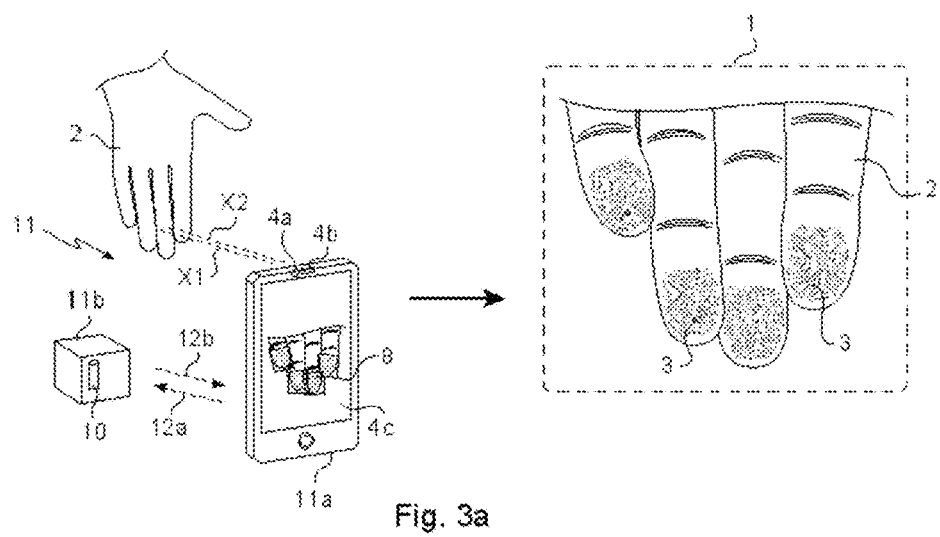
FIG. 3a presents a perspective view of the device for determining zones according to the invention whilst it is used to produce an image acquired on which are identified zones each representing at least one print.
Figure 3B:
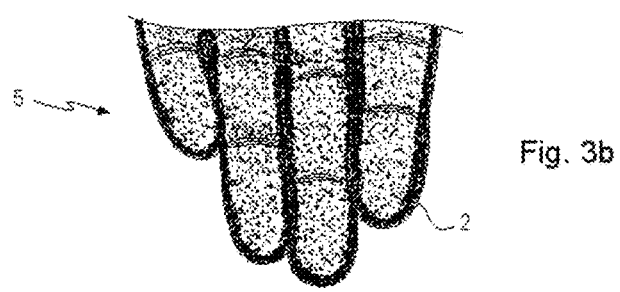
Figure 3C:
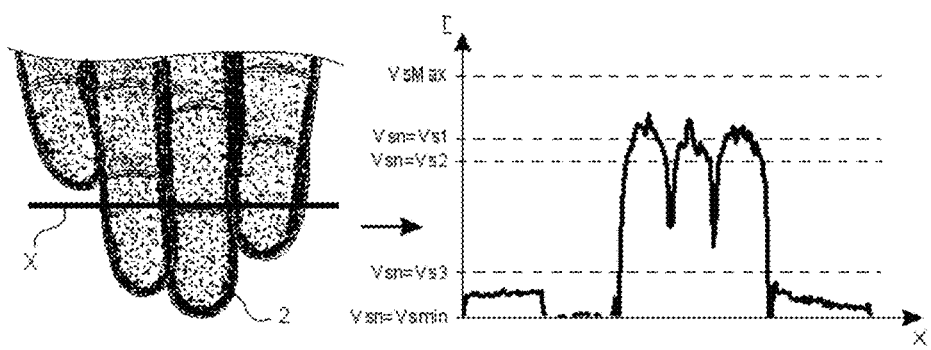
FIG. 3c symbolizes a line of the image 3b and a graphic presenting the variation of the intensity level along this line; this graphic represents the luminous intensity levels of the points of the line as grey levels.

The detail of this step E of determining the plurality of zones is also comprehensible with the aid of FIG. 3C.

If we consider a straight line X composed of several points of the grey level image, it is possible to represent a curve of variation, point by point, of level of luminous intensity I along this line X.

It is observed that this variation is spread between the thresholds Vsmin and VsMax and sometimes passes above intermediate thresholds Vs3, Vs2, Vs1. If one views the zones determined with a threshold value Vsn=VsMax, an image visible in FIG. 3e1 not comprising any zone is obtained. In this FIG. 3e1, none of the points of the image exhibits a luminous intensity level greater than or equal to VsMax.

By selecting the value Vs1, it is observed that some of the points of the line X have an inherent luminous intensity greater than or equal to Vs1. The continuous zones Z1a, Z1b, Z1c, Z1d, formed of these points, are visible in FIG. 3e2.

By selecting a new value Vs2 less than Vs1, then zones Z2a, Z2b, Z2d visible in FIG. 3e3 are again obtained.

Finally, with another threshold value Vs3 less than Vs2, a single new continuous zone visible in FIG. 3e4 is obtained.

It is observed that each zone determined with a high intensity threshold value Vsn is always included inside a zone determined with a low intensity threshold value Vsn.

It is possible to choose VsMax and Vsmin so that the threshold values selected each allow the generation of a number of determined zones lying between a minimum number, for example 3 zones, and a maximum number of zones, for example 8 zones. This makes it possible to limit the volume of the set of determined zones.

Once having reached the end of the process of enumeration/determination of the zones, that is to say on completion of step E, successive filtering steps F and G are carried out which are intended to identify the zones of the image which are each highly liable to comprise at least one finger print.

Step F is implemented with filter criteria of a first type which make it possible to analyse one by one the zones of the set of determined zones.

These criteria of the first type can be criteria relating to zone size, zone shape (elongate), or presence of characteristics representative of print morphology.

Step G is implemented so as to generate, on the basis of the zones retained in step F, a set of retained zones which are highly liable to represent prints belonging to one and the same hand of an individual.

These criteria of a second type can be criteria relating to maximum spacing between the zones, relative dispositions between the zones. According to the latter criterion, the zones retained are those disposed along a curve liable to extend along the papillary ends of the fingers of one and the same hand.

The image acquired 1 may arise from a series of images 1 which belong to a video stream generated with the said optical sensor 4a whilst the hand is illuminated by the optical lighting means 4b.

The video stream comprises a succession of images. These images of the video stream are used in turn as acquired image 1 and the zones liable to contain at least one finger print are determined for each of the images of the succession of images of the video stream.

It is noted that it is possible to search for the zones which match one another in the succession of images, that is to say the zones which represent one and the same finger print, and to choose, from among the zones which match, the zone which contains the best representation of the given print.

This zone is recorded in the set of retained zones, the other corresponding zones of the other images being excluded from the set of zones retained.

Ideally, as seen in FIGS. 3a and 3d, at least one image of the video stream is displayed on a display means 4c and a graphical symbol 8, such as a frame, indicating a site of the image 1 where the said at least one zone Z1d of the acquired image which is liable to represent at least one finger print is situated is superimposed on this displayed image. Thus, on the displayed image are tagged each of the zones of the set of zones retained on completion of the filterings of steps F and G. This set of the zones retained is finalized in step H, after implementation of the filtering steps F and G.

These images of the video stream are preferentially displayed in real time, that is to say after a latency time not exceeding 2 seconds between the moment of capture of the image in the video stream and the moment of its display on the screen 4c with the symbol(s) 8 superimposed.

The display of the frames 8 allows the user to know whether or not the print identification is satisfactory. A particular symbol may also be displayed to signal to the user that his print has indeed been identified in the prerecorded database.

An advantage of the method according to the invention is that it can be implemented under conditions of variable lights, even if the acquired image exhibits a hand background which is shifting and indeterminate. This method is thus usable as a means of identification on mass-market mobile telephone handsets.

It is noted that the identification of a match between characteristics of prints of the image and characteristics of a database of prints can be carried out at the same time as the acquisition of new images taken on the fly.

The invention claimed is:

1. A method of detecting zones (Z1a, Z1b, Z1c, Z1d, Z2a, Z2b, Z2d, Z3a) liable to contain at least one finger print in an image of at least one portion of hand of an individual, the method comprising:
   a) a step of acquiring the image of at least one illuminated portion of hand with the aid of an optical sensor and without contact with this hand;
   b) a step of determining a plurality of zones (Z1a, Z1b, Z1c, Z1d) of the acquired image, each zone thus determined being a continuous zone of points of the acquired image which each exhibit a luminous intensity level (I) greater than or equal to a luminous intensity threshold value (Vsn, Vs1) selected for the determination of the zone thus determined; and
   c) a first selection step for selecting, from among the zones determined, the zones which are liable to represent at least one print of a finger, this selection being carried out with the aid of at least one filtering criterion of a first type, chosen from among a finger shape identification criterion and/or a finger print standard texture identification criterion and/or a finger standard color identification criterion and in which a set of threshold values (Vsn, Vs, Vs2, Vs3) of luminous intensity (I) lying between a minimum threshold value (Vsmin) of intensity (I) and a maximum threshold value (VsMax) of intensity (I) is selected and the step of determining a plurality of zones of the acquired image is carried out with the aid of each of the threshold values (Vs1, Vs2, Vs3) of the set of threshold values (Vsn), and then the plurality of the zones (Z1a, Z1b, Z1c, Z1d, Z2a, Z2b, Z2d, Z3a) of the captured image which have been determined with each of the threshold values (Vs1, Vs2, Vs3) of the set of threshold values (Vsn) is stored.

2. The method of detection according to claim 1, further comprising a second selection step comprising filtering the previously selected zones (Z1a, Z1b, Z1c, Z1d, Z2a, Z2b, Z2d, Z3a) on completion of the first selection step, with the aid of at least one filtering criterion of a second type, chosen from among:
   a criterion of maximum separation between zones (Z1a, Z1b, Z1c, Z1d, Z2a, Z2b, Z2d, Z3a), this maximum separation criterion being determined so as to retain, in a set of retained zones, only zones previously selected on completion of the first selection step, which are mutually neighbouring and which are liable to represent solely portions of prints of fingers of one and the same hand; and/or a criterion of areal ratio between mutually neighbouring zones (Z1a, Z1b, Z1c, Z1d, Z2a, Z2b, Z2d, Z3a), this areal ratio criterion being determined so that the ratio between areas of mutually neighbouring zones lies between predetermined minimum and maximum values of areal ratio, the mutually neighbouring zones which meet this areal ratio criterion being retained in a set of retained zones; and/or a criterion of relative orientation between mutually neighbouring zones (Z1a, Z1b, Z1c, Z1d, Z2a, Z2b, Z2d, Z3a), the mutually neighbouring zones which meet this orientation criterion being retained in a set of retained zones.

3. The method of detection according to claim 1, further comprising, when the acquired image is a color image and, generating a grey level image on the basis of the color image acquired to determine the levels of luminous intensity of the points of the acquired image.

4. The method of detection according to claim 1, further comprising comparing characteristics of each of the zones (Z1a, Z1b, Z1c, Z1d, Z2a, Z2b, Z2d, Z3a) of the set of retained zones with characteristics of images of fingerprints contained in a prerecorded database and, in case of a match between characteristics of one of the zones of the set of retained zones and of one of the fingerprints of the prerecorded database, storing an identification link representative of this match.

5. The method of detection according to claim 1, wherein, in order to carry out the step of acquiring the image, the illuminated hand is displaced facing a principal optical axis (X1) of the optical sensor.

6. The method of detection according to claim 5, further comprising, in order to carry out the step of acquiring the image, illuminating the hand with an optical means of artificial lighting exhibiting a principal lighting axis (X2) at least at the moment of the acquisition of the image by the optical sensor.

7. The method of detection according to claim 6, wherein the optical sensor and the optical lighting means are mechanically interlinked and are designed so that the optical axis (X1) and the principal lighting axis (X2) are mutually parallel.

8. The method of detection according to claim 1, wherein the acquired image arises from a series of images belonging to a video stream generated with the said optical sensor.

9. The method of detection according to claim 8, wherein at least one image of the video stream is displayed on a display means and a graphical symbol, indicating a site of the image where the said at least one zone (Z1d) of the acquired image which is liable to represent at least one finger print is situated is superimposed on the displayed image of the video stream.

10. The method of detection according to claim 8, wherein the video stream comprises a succession of images, each of the images of this succession is used in turn as acquired image, the zones liable to contain at least one finger print are determined in each of the images of the succession of images of the video stream.

11. The method of detection according to claim 9, wherein the graphical symbol is a frame.

12. The method of detection according to claim 1, further comprising:

a step of determining at least one zone in the image by using a device, the device comprising a local group of means assembled together and a remote group of means for identifying individuals on the basis of characteristics of fingerprints, said local group of means comprising said optical sensor, at least a memory, at least a processor, telecommunication means adapted to exchange data with said remote group of means, and at least a program executed by the processor to implement said step of determining a plurality of zones of the acquired image and said first selection step for selecting, from among the zones determined, the zones which are liable to represent at least one print of a finger, said local group of means being further arranged to transmit to the remote group of means data containing characteristics representative of the prints represented on the determined zones of the image.

13. A determination device for determining, in an image, at least one zone (Z1a, Z1b, Z1c, Z1d, Z2a, Z2b, Z2d, Z3a) of this image which is liable to represent at least one finger print of an individual, this device being adapted to implement the method according to claim 1.

14. The determination device according to claim 13, wherein the device comprises an intelligent telephone.

* * * * *